US00RE34480E

United States Patent [19]

Eda

[11] E Patent Number: Re. 34,480

[45] Reissued Date of Patent: Dec. 14, 1993

[54] NAPHTHALOCYANINE COMPOUNDS

[75] Inventor: Tsunehito Eda, Kashihara, Japan

[73] Assignee: Yamamoto Kagaku Gosei Co., Ltd., Osaka, Japan

[21] Appl. No.: 940,309

[22] Filed: Sep. 3, 1992

Related U.S. Patent Documents

Reissue of:

[64] Patent No.: 4,622,179
Issued: Nov. 11, 1986
Appl. No.: 631,700
Filed: Jul. 17, 1984

[30] Foreign Application Priority Data

Jul. 19, 1983 [JP] Japan ..... 58-130272
Mar. 5, 1984 [JP] Japan ..... 59-41618

[51] Int. Cl.[5] ..... C09B 47/04
[52] U.S. Cl. ..... 540/139; 540/140
[58] Field of Search ..... 540/140, 139

[56] References Cited

FOREIGN PATENT DOCUMENTS 1580683 9/1969 France .
321131 5/1972 U.S.S.R. .

OTHER PUBLICATIONS

Mikhalenko et al., Chemical Abstracts, vol. 77 (1972) 116052n.
Beavan, Chemical Abstracts, vol. 97, (1982) 129504z.

*Primary Examiner*—Richard L. Raymond

*Attorney, Agent, or Firm*—Armstrong, Westerman, Hattori, McLeland & Naughton

[57] ABSTRACT

Naphthalocyanine compounds represented by the general formula

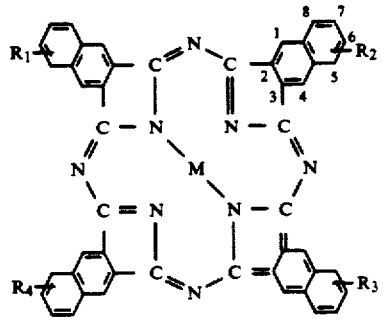

wherein $R_1$, $R_2$, $R_3$ and $R_4$, which may be the same or different, are each a straight chain or branched chain alkyl group of 5 to 12 carbon atoms and M is a metal selected from the group consisting of Cu, Ni, Mg, Pb, Pd, V, Co, [Nb,] Al, Sn, In, Fe and Ge, or its oxide, chloride or bromide, are bluish green or green crystals and are superior in absorption or near infrared rays of 750 and 850 nm, highly resistant to light, heat, acids and alkalis, soluble in organic acids, liquid crystals and resins, and accordingly are very useful as a dyestuff capable of absorbing near infrared rays.

17 Claims, No Drawings

NAPHTHALOCYANINE COMPOUNDS

Matter enclosed in heavy brackets [ ] appears in the original patent but forms no part of this reissue specification; matter printed in italics indicates the additions made by reissue.

This invention relates to novel naphthalocyanine compounds. More particularly, the present invention relates to novel naphthalocyanine compounds represented by the general formula (I)

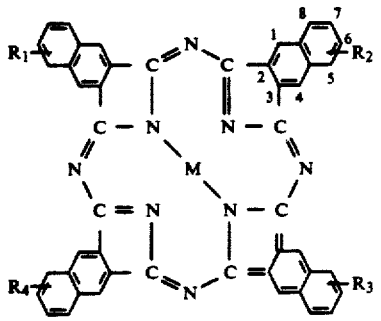

(I)

wherein $R_1$, $R_2$, $R_3$ and $R_4$, which may be the same or different, are each a straight chain or branched chain alkyl group of 5 to 12 carbon atoms and M is a metal selected from the group consisting of Cu, Ni, Mg, Ph, Pd, V, Co, [Nb,] Al, Sn, In, Fe and Ge, or its oxide, chloride or bromide.

Naphthalocyanine compounds represented by the general formula (I) according to the present invention, are bluish green or green crystals and are superior in absorption of near infrared rays of 750 to 850 nm, highly resistant to light, heat, acids and alkalis, soluble in organic solvents, liquid crystals and resins, and accordingly are very useful as a dyestuff capable of absorbing near infrared rays.

In recent years, extensive research has been made on the utilization of a semiconductor laser beam in writing and reading-out for video discs, liquid crystal display instruments, optical character readers and the like. In order to increase the efficiency of writing and reading-out by the use of a semiconductor laser beam, a substance capable of absorbing semiconductor laser beams, namely, near infrared rays is indispensable. Hence, development of a substance superior in absorption of near infrared rays has strongly been desired.

Cyanine dyestuff is well known as an organic compound absorbing near infrared rays. Although the cyanine dyestuff well absorbs near infrared rays, it is very poor in light resistance and durability. Hence, there are a number of limitations in actual use of cyanine dyestuff. Also, metal complexes of oxime and thiol are known as organic compounds absorbing near infrared rays. These complexes are inferior in absorption of near infrared rays and, in certain media, the complexes release the metal resulting in loss of the ability to absorb near infrared rays.

In order to overcome the above-mentioned drawbacks of conventional dyestuffs which absorb near infrared rays, the present inventor has focused on naphthalocyanine compounds and has made extensive research with the particular objective of improving the solubility of naphthalocyanine compounds. As a result, it was found that introduction of alkyl groups of 5 to 12 carbon atoms as shown in the general formula (I) greatly enhances the solubility of naphthalocyanine compounds in organic solvents, etc. Based on this finding, the present invention has been completed.

As shown in the art, in production of optical discs, a coating method such as spin-coating as a means of forming a recording film at a low cost is drawing attention. In order to enable the formation of a recording film by a coating method, it is indispensable that the dyestuff used by soluble in the solvent used. Therefore, improvement of the solubility in solvents of the dyestuff is very useful.

As naphthalocyanine compounds, there has been known tetra-6-tert-butylvanadylnaphthalocyanine of the following general formula (II) described in Zh. Obs. khim, 42 696–699 (1972):

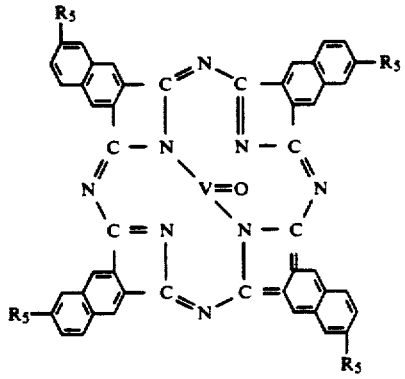

(II)

wherein $R_5$ is tert-butyl. However, as shown in Table 1, this compound has a much lower solubility in organic solvents than the compounds of the general formula (I) according to the present invention.

TABLE 1

| Solubility in Toluene | |
|---|---|
| Substituent of vanadylnaphthalocyanine | Solubility (%) |
| tert-heptyl (present invention) | 11 |
| tert-amyl (present invention) | 6 |
| tert, sec-mixed amyl (present invention) | 7 |
| tert-butyl | 2 |

MEASUREMENT OF SOLUBILITY

In a 20 ml test tube were placed 1 g of a naphthalocyanine compound and 5 ml of toluene. After the tube was tightly stoppered, the content was subjected to ultrasonic shaking at 50° C. for 10 min. Then, the tube was allowed to stand at room temperature for 30 min. and the content was filtered. The filtrate was concentrated to dryness. The solubility of the naphthalocyanine in toluene was calculated using the following equation.

$$\text{Solubility (\%)} = \frac{\text{Residue of concentration to dryness}}{\text{Toluene 5 ml}} \times 100$$

$R_1$, $R_2$, and $R_3$ and $R_4$ of naphthalocyanine compounds of the present invention can bond to 6 to 7 positions of all naphthalene nuclei of naphthalocyanine. Each of these groups can be a mixed group.

Specific examples of naphthalocyanine compounds according to the present invention, wavelengths at which these naphthalocyanine compounds show their respective largest absorption peaks in toluene, and absorptivity coefficients of the naphthalocyanine compounds are shown in Table 2. It is to be noted that the naphthalocyanine compounds according to the present invention are not restricted to the compounds shown in Table 2.

TABLE 2

| Substituent | M | Wavelength at largest absorption peak (nm) | Absorptivity coefficient (log ε) |
|---|---|---|---|
| tert-amyl | Cu | 771 | 5.24 |
| tert-amyl | Ni | 765 | 5.14 |
| tert-amyl | Mg | 781 | 5.16 |
| tert-amyl | Pb | 782 | 5.12 |
| tert-amyl | Pd | 782 | 5.12 |
| tert-amyl | VO | 808 | 5.37 |
| tert, sec-mixed amyl | Co | 757 | 5.09 |
| [tert, sec-mixed amyl | No | 782 | 5.06] |
| tert, sec-mixed amyl | Al—Cl | 781 | 5.04 |
| tert, sec-mixed amyl | Sn | 781 | 4.08 |
| tert, sec-mixed amyl | In | 805 | 5.09 |
| tert, sec-mixed amyl | Fe—Cl | 782 | 5.13 |
| tert, sec-mixed amyl | Ge | 781 | 5.07 |
| tert, sec-mixed amyl | VO | 809 | 5.32 |
| tert-heptyl | VO | 809 | 5.27 |
| tert-octyl | VO | 809 | 5.41 |
| tert-dodecyl | VO | 813 | 5.29 |

Wavelengths at which naphthalocyanine compounds of the present invention show largest absorption peaks vary by the type of M of the general formula (I), however, do not vary much by the type of substituents ($R_1$, $R_2$, $R_3$ and $R_4$).

Naphthalocyanine compounds of the present invention can be produced, for example, by reacting, with heating, 2,3-dicyanonaphthalenes represented by the following formula (III):

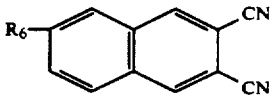

(III)

(wherein $R_6$ is an alkyl group of 5 to 12 carbon atoms) with a metal chloride in the presence of urea. 2,3-Dicyanonaphthalenes of the general formula (III) used in production of naphthalocyanine compounds of the present invention are synthesized as follows.

1. Synthesis of 6-tert-amyl-2,3-dicyanonaphthalene (V)

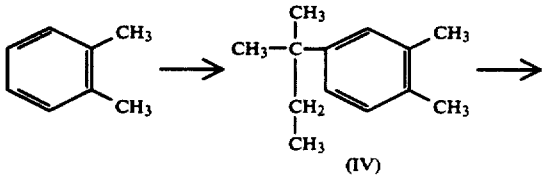

(IV)

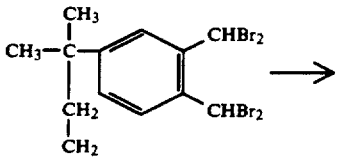

-continued

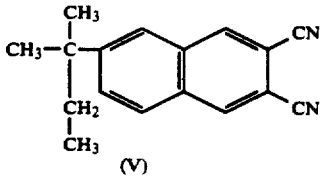

(V)

To 450 g of o-xylene is added 15 g of anhydrous ferric chloride. The mixture is saturated with dry hydrogen chloride gas. Thereto is added dropwise 100 g of 2-methyl-2-butene at 10° C. to 20° C. in 30 min. The mixture is stirred at the same temperature for 5 hr. Then, 100 g of 10% sulfuric acid is added thereto and insolubles are removed by filtration. The organic layer of the filtrate is separated. The layer is washed with a dilute aqueous sodium hydroxide solution and then with hot water. Thereafter, excessive o-xylene is distilled off. The residue is subjected to distillation under reduced pressure, whereby 210 g of a colorless liquid is obtained. The liquid has a boiling point of 114° to 116° C. at 20 mm Hg. The following analytical results confirmed that the liquid was 6-tert-amyl-2,3-dimethylbenzene (IV).

Elemental analysis:

| | C | H |
|---|---|---|
| Calculated: | 88.54 | 11.46 |
| Measured: | 88.77 | 11.42 |

Infrared spectrum:

Has characteristic peaks of 1,2,4-substituents at 880 cm− and 820 cm−.

To 500 ml of carbon tetrachloride are added 35 g of 6-tert-amyl-2,3-dimethylbenzene (IV), 140 g of N-bromosuccinimide and 1 g of benzoyl peroxide. The mixture is refluxed for 12 hr. under irradiation by an incandescent lamp. After cooling, the solid portion is removed by filtration. The filtrate is freed of carbon tetrachloride by distillation. To the residue is added 100 ml of n-hexane and the mixture is stirred. The resulting precipitate is collected by filtration and dried in air to obtain 70 g of a white crystal. It had a melting point of 64.5° to 66° C.

49 G of this white crystal, 8 g of fumaronitrile and 100 g of sodium iodide are added to 700 ml of dimethylformamide, and the mixture is stirred at 70° to 75° C. for 7 hr. After cooling, the reaction mixture is placed in 1 liter of water. Thereto is added 150 ml of 10% sodium hydrogen sulfite. The whole mixture is subjected to extraction with 500 ml of toluene. The resulting toluene layer is washed with hot water and then concentrated by distillation of toluene. To the residue is added 100 ml of n-hexane and the mixture is stirred. The resulting precipitate is collected by filtration and recrystallized from benzene/petroleum ether to obtain 13 g of a slightly colored crystal. The crystal had a melting point of 94.5° to 96° C. The following analytical results confirmed that the crystal was 6-tert-amyl-2,3-dicyanonaphthalene (V).

Elemental analysis:

| | C | H | N |
|---|---|---|---|
| Calculated: | 82.21 | 6.51 | 11.28 |

-continued

| | C | H | N |
|---|---|---|---|
| Measured: | 82.18 | 6.48 | 11.31 |

Infrared spectrum:
Has a characteristic peak of nitrile at 2240 cm−.

2. Synthesis of 6-tert, sec-mixed amyl-2,3-dicyanonaphthalene (VI)

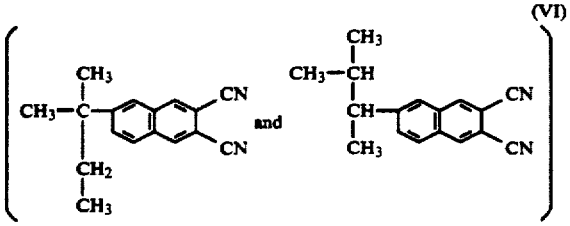

(VI)

O-xylene is amylated in the presence of aluminum chloride in the same manner as in the Synthesis 1 whereby 4-tert, sec-mixed amyl-o-xylene is obtained. This compound is brominated and reacted with fumaronitrile in the same manner as in the Synthesis 1 whereby 6-tert, sec-mixed amyl-2,3-diacyanonaphthalene (VI) is obtained as a slightly brown viscous oil. The infrared spectrum of this compound has characteristic peaks of nitrile at 2240 cm− and 2225 cm−.

3. Synthesis of 6-tert-heptyl-2,3-dicyanonaphthalene (VII)

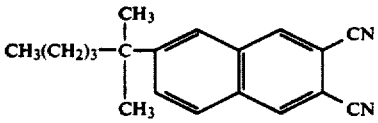

(VII)

In the same manner as in the Synthesis 1 except that 2-methyl-2-hexene is used in place of 2-methyl-2-butene, there is obtained 6-tert-heptyl-2,3-dicyanonaphthalene (VII) as a slightly brown viscous oil. The infrared spectrum of this compound has a characteristic peak of nitrile at 2230 cm−.

Next, the present invention will be explained specifically by way of Examples.

EXAMPLE 1

Production of tetra-tert-amylvanadylnaphthalocyanine

15 Grans of 6-tert-amyl-2,3-dicyanonaphthalene, 3.8 g of vanadyl trichloride and 70 g of urea were reacted at 195° to 200° C. for 2 hrs. After cooling, the reaction mixture solid was mixed with 300 ml of 5% hydrochloric acid. The mixture was heated to 50° C., whereby the solid became friable. Stirring was conducted at 50° C. for 30 min. The insolubles were collected by filtration and the cake thus obtained was again treated with 300 ml of 5% hydrochloric acid and then washed with hot water. Then, the cake was combined with 200 ml of 10% sodium hydroxide and they were stirred at 70° C. for 30 min. The insolubles were collected by filtration. The resulting cake was again treated with 200 ml of 10% sodium hydroxide and washed with hot water. Subsequently, the cake was combined with 200 ml of methanol and they were refluxed for 30 min. The insolubles were collected by filtration and dried to obtain 10 g of a crude product. The crude product was combined with 300 ml of toluene and they were stirred at 80° C. for 30 min. The insolubles were removed by filtration and the toluene solution was subjected to silica gel column chromatography to obtain 2.4 g of a refined product.

Elemental analysis confirmed that this was a product of the captioned compound.

| | $C_{68}H_{64}N_8OV$ | | |
|---|---|---|---|
| | C | H | N |
| Calculated: | 77.02 | 6.10 | 10.57 |
| Measured: | 77.21 | 6.21 | 10.32 |

Tetra-tert-amylvanadylnaphthalocyanine thus obtained was a green crystal. Its solubility in toluene as measured according to the above mentioned method was 6% (0.6 g of residue).

Near infrared absorption spectrum for toluene solution:

Wavelength at largest absorption peak: 808 nm
Absorptivity coefficient (log ε): 5.37

EXAMPLE 2

Production of copper tetra-tert-amylnaphthalocyanine

20 Grams of 6-tert-amyl-2,3-dicyanonaphthalene (V), 3.4 g of cupric chloride, 0.1 g of ammonium molybdate and 80 g of urea were reacted at 195° to 200° C. for 2 hrs. After cooling the reaction mixture solid was mixed with 300 ml of 5% hydrochloric acid. The mixture was heated to 50° C. and the solid became gradually friable. The mixture was stirred at 50° C. for 30 min. The insolubles wre collected by filtration. The cake thus obtained was treated again with 300 ml of 5% hydrochloric acid and then washed with hot water. Subsequently, the cake was combined with 200 ml of 10% sodium hydroxide, and they were stirred at 70° C. for 30 min. The insolubles were collected by filtration. The cake obtained was again treated with 200 ml of 10% sodium hydroxide and then washed throroughly with hot water. The cake was combined with 200 ml of methanol and the mixture was refluxed for 30 min. The insolubles were collected by filtration and dried to obtain 8 g of a crude product. The crude product was combined with 300 ml of toluene and they were stirred at 80° C. for 30 min. The insolubles were removed by filtration and the toluene solution was subjected to silica gel column chromatography to obtain 1.5 g of a refined product as a bluish green crystal. Elemental analysis confirmed that this was a product of the captioned compound.

| | $C_{68}H_{64}N_8Cu$ | | |
|---|---|---|---|
| | C | H | N |
| Calculated: | 77.27 | 6.12 | 10.60 |
| Measured: | 77.38 | 6.02 | 10.51 |

The solubility of the product in toluene as measured according to the above mentioned method was 7%.

Near infrared absorption spectrum for toluene solution:

Wavelength at largest absorption peak: 771 nm
Absorptivity coefficient (log ε): 524

EXAMPLE 3

Production of tetra-tert, sec-mixed amylvanadylnaphthalocyanine

20 Grams of a mixture of 6-tert-amyl-2,3-dicyanonaphthalene and 6-sec-amyl-2,3-dicyanonaphthalene, 5,6 g of vanadyl trichloride and 50 g of urea were reacted at 190° to 195° C. for 1 hr. To the reaction mixture solid after cooling was applied the same procedure as in Example 1. The crude product obtained was refined by column chromatography to obtain 3.4 g of the intended product.

Elemental analysis confirmed that this product was the intended product.

| | $C_{68}H_{64}N_8OV$ | | |
|---|---|---|---|
| | C | H | N |
| Calculated: | 77.02 | 6.10 | 10.57 |
| Measured: | 77.17 | 5.98 | 10.49 |

Tetra-tert, sec-mixed amylvanadylnaphthalocyanine thus obtained was a green crystal. Its solubility in toluene as measured according to the above mentioned method was 7% (0.6 g of residue).

Near infrared absorption spectrum for toluene solution:

Wavelength at largest absorption peak: 809 nm

Absorptivity coefficient (log ε): 5.32

EXAMPLE 4

Production of Indium tetra-tert, sec-mixed amylnaphthalocyanine

20 Grams of 6-tert, sec-mixed amyl-2,3-dicyanonaphthalene, 5 g of Indium chloride, 0.1 g of ammonium molybdate and 80 g of urea were reacted at 198° to 200° C. for 2 hrs. The reaction mixture was treated in the same manner as in Example 1. Finally, by refining by column chromatography, there was obtained 3 g of the intended product as a green crystal. Elemental analysis confirmed that this product was the intended product.

| | $C_{68}H_{64}N_8In$ | | |
|---|---|---|---|
| | C | H | N |
| Calculated: | 73.69 | 5.83 | 10.11 |
| Measured: | 73.81 | 5.72 | 10.04 |

The solubility of this compound in toluene as measured according to the above mentioned method was 7%.

Near infrared absorption spectrum for toluene solution:

Wavelength at largest absorption peak: 805 nm

Absorptivity coefficient (log ε): 5.09

EXAMPLE 5

Production of tetra-tert-heptylvanadylnaphthalocyanine

6 Grams of 6-tert-heptyl-2,3-dicyanonaphthalene, 1.2 g of vanadyl trichloride and 22 g of urea were reacted at 195° to 198° C. for 2 hrs. The reaction mixture was treated in the same manner as in Example 1. Finally, refining by the column chromatography was conducted, whereby 1 g of the intended product was obtained as a green crystal.

Elemental analysis confirmed that this was a product of the captioned compound.

| | $C_{76}H_{80}N_8VO$ | | |
|---|---|---|---|
| | C | H | N |
| Calculated: | 77.84 | 6.89 | 9.56 |
| Measured: | 77.73 | 6.92 | 9.64 |

The solubility of this compound in toluene as measured according to the above mentioned method was 11%.

Near infrared absorption spectrum for toluenee solution:

Wavelength at largest absorption peak: 809 nm

Absorptivity coefficient (log ε): 5.27

As described above, there are provided, according to the present invention, naphthalocyanine compounds which are useful dyestuffs absorbing near infrared rays and well soluble in organic solvents.

Naphthalocyanine compounds according to the present invention can be used as near infrared rays-absorbing dyestuffs for various applications such as optical recording media, liquid crystal display instruments, ball pens for OCR, optical filters, coloring and dyeing of resins, coloring of inks and coatings and the like.

I claim:

1. A naphthalocyanine compound represented by the general formula

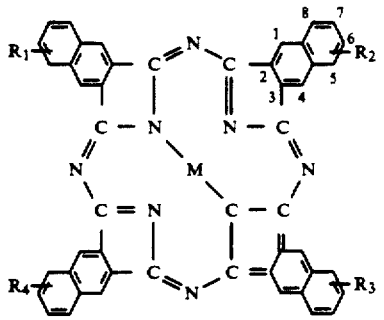

characterized in that $R_1$, $R_2$, $R_3$ and $R_4$, which may be the same or different, are each a straight or branched alkyl group of 5 to 12 carbon atoms and M is a metal selected from the group consisting of Cu, Ni, Mg, Pb, Pd, V, Co, [Nb,] Al, Sn, In, Fe and Ge or its oxide, chloride or bromide.

2. A naphthalocyanine compound as claimed in claim 1, characterized by being tetra-tert-amylvanadylnaphthalocyanine.

3. A naphthalocyanine compound as claimed in claim 1, characterized by being copper tetra-tert-amylnaphthalocyanine.

4. A naphthalocyanine compound as claimed in claim 1, characterized by being nickel tetra-tert-amylnaphthalocyanine.

5. A naphthalocyanine compound as claimed in claim 1, characterized by being magnesium tetra-tert-amylnaphthalocyanine.

6. A naphthalocyanine compound as claimed in claim 1, characterized by being lead tetra-tert-amylnaphthalocyanine.

7. A naphthalocyanine compound as claimed in claim 1, characterized by being palladium tetra-tert-amylnaphthalocyanine.

8. A naphthalocyanine compound as claimed in claim 1, characterized by being cobalt, tetra-tert, sec-mixed amylnaphthalocyanine.

[9. A naphthalocyanine compound as claimed in claim 1, characterized by being niobium tetra-tert, sec-mixed amylnaphthalocyanine.]

10. A naphthalocyanine compound as claimed in claim 1, characterized by being aluminum tetra-tert, sec-mixed amylnaphthalocyanine chloride.

11. A naphthalocyanine compound as claimed in claim 1, characterized by being tin tetra-tert, sec-mixed amylnaphthalocyanine.

12. A naphthalocyanine compound as claimed in claim 1, characterized by being indium tetra-tert, sec-mixed amylnaphthalocyanine.

13. A naphthalocyanine compound as claimed in claim 1, characterized by being iron tetra-tert, sec-mixed amylnaphthalocyanine chloride.

14. A naphthalocyanine compound as claimed in claim 1, characterized by being germanium tetra-tert, sec-mixed amylnaphthalocyanine.

15. A naphthalocyanine compound as claimed in claim 1, characterized by being tetra-tert, sec-mixed amylvanadylnaphthalocyanine.

16. A naphthalocyanine compound as claimed in claim 1, characterized by being tetra-tert-heptylvanadylnaphthalocyanine.

17. A naphthalocyanine compound as claimed in claim 1, characterized by being tetra-tert-octylvanadylnaphthalocyanine.

18. A naphthalocyanine compound as claimed in claim 1, characterized by being tetra-tert-dodecylvanadylnaphthalocyanine.

* * * * *